US011332323B1

(12) United States Patent
Zheng

(10) Patent No.: US 11,332,323 B1
(45) Date of Patent: May 17, 2022

(54) CONVEYING DEVICE FOR A LAWN MOWER BLADE

(71) Applicant: Hangzhou Zhengchida Precision Machinery Co., Ltd., Hangzhou (CN)

(72) Inventor: Lei Zheng, Hangzhou (CN)

(73) Assignee: Hangzhou Zhengchida Precision Machinery Co., Ltd., Hangzhou (CN)

( * ) Notice: Subject to any disclaimer, the term of this patent is extended or adjusted under 35 U.S.C. 154(b) by 0 days.

(21) Appl. No.: 17/386,919

(22) Filed: Jul. 28, 2021

(30) Foreign Application Priority Data

Feb. 3, 2021 (CN) .......................... 202110149761.3

(51) Int. Cl.
*B65G 47/90* (2006.01)
*B65G 47/92* (2006.01)
*B65G 35/06* (2006.01)

(52) U.S. Cl.
CPC ......... *B65G 47/907* (2013.01); *B65G 35/066* (2013.01); *B65G 47/92* (2013.01); *B65G 2201/022* (2013.01)

(58) Field of Classification Search
CPC .... B65G 47/90; B65G 47/901; B65G 47/905; B65G 47/907; B65G 47/91; B65G 47/912; B65G 47/917; B65G 47/92; B65G 35/066; B21D 43/055; B23Q 7/1473; B25J 5/02
See application file for complete search history.

(56) References Cited

U.S. PATENT DOCUMENTS

| | | | | |
|---|---|---|---|---|
| 4,310,320 | A * | 1/1982 | Pitchford | B63H 5/08 440/61 F |
| 4,573,862 | A * | 3/1986 | Anderson | B65G 47/901 198/468.2 |
| 5,915,916 | A * | 6/1999 | Saji | F16H 25/2418 414/749.1 |
| 6,543,605 | B2 * | 4/2003 | Faitel | B65G 47/901 198/468.6 |
| 7,047,790 | B2 * | 5/2006 | Suzuki | B21D 43/055 198/621.1 |

* cited by examiner

*Primary Examiner* — William R Harp
(74) *Attorney, Agent, or Firm* — Hamilton, Brook, Smith & Reynolds, P.C.

(57) ABSTRACT

A conveying device for a lawn mower blade is provided. The conveying device includes a platform, a motor fixed on the platform, five grippers slidably and horizontally provided on the platform through a guiding mechanism, a lead screw mechanism transmitting a motive power of the motor to translate one of the five grippers, and a synchronization mechanism connecting every adjacent two grippers. The guiding mechanism includes a horizontally arranged guide rail, and five sliding blocks translatable along the guide rail. The guide rail includes five sections, and each section is provided with a corresponding one sliding block. Each gripper is fixed to the corresponding one sliding block. The synchronization mechanism is arranged between adjacent two grippers, and includes a connecting rod, and universal joints provided on two ends of the connecting rod and each connected with a corresponding gripper.

3 Claims, 6 Drawing Sheets

CONVEYING DEVICE FOR A LAWN MOWER BLADE

CROSS REFERENCE TO RELATED APPLICATION

This application claims priority under 35 U.S.C. § 119 or 365 to Chinese Application No. 202110149761.3, filed on Feb. 3, 2021. The entire teachings of the above application are incorporated herein by reference.

TECHNICAL FIELD

The disclosure relates to a production equipment for a lawn mower blade, in particular to a conveying device for a lawn mower blade.

BACKGROUND ART

Lawn mower blades are kind of tools used for the garden maintenance. The processing process for the blade mainly includes a cutting step, a centering step, a punching step, an overturning step, a stamping step, a blanking step and other steps. Although the above-mentioned processing steps have been automated, it is still necessary to rely on manually transferring the blade between the various stations, which limits the further improvement of production efficiency.

SUMMARY

The purpose of the present disclosure is to overcome the deficiencies in the above-mentioned background art, and provide a conveying device for a lawn mower blade. The conveying device is able to automatically convey the blade to stations, thereby improving the automation degree of the entire production process.

A conveying device for a lawn mower blade, the conveying device comprising: a platform, a motor fixed on the platform, five grippers that are slidably and horizontally provided on the platform through a guiding mechanism, a lead screw mechanism configured to transmit a drive power of the motor to translate one of the five grippers, and a synchronization mechanism connecting every adjacent two of the five grippers; wherein the guiding mechanism comprises a horizontally arranged guide rail, and five sliding blocks that are translatable along the guide rail; the guide rail comprises five sections, and each of the five sections is provided with a corresponding one of the five sliding blocks; each of the five grippers is fixed to the corresponding one of the five sliding blocks; the synchronization mechanism is arranged between adjacent two of the five grippers, and the synchronization mechanism comprises a connecting rod, and universal joints that are provided on two ends of the connecting rod and each connected with a corresponding one of the five grippers.

The lead screw mechanism comprises a lead screw arranged on the platform and being rotatable around a horizontal axis, a coupling coaxially connected with both an output shaft of the motor and the lead screw, and a nut engaged with the lead screw and fixed with a corresponding one of the five grippers.

Each of the five gripper comprises a mounting seat fixed to the corresponding one of the five sliding blocks, a cantilever fixed to the mounting seat, and first connecting plates fixed at two sides of the mounting seat and configured to connect the universal joints respectively, and an electromagnet fixed on a front end of the cantilever.

The platform comprises a base, a guide rail support plate and a lead screw support plate which are fixed on the base. Each of the five segments is fixed to the guide rail support plate through a segment support plate; the motor is fixed to the lead screw support plate; and the lead screw mechanism is installed on the lead screw support plate.

The beneficial effects of the present disclosure are as follows.

In the disclosure, five grippers are driven by the motor and the lead screw mechanism, so as to translate synchronously on the guide rail. The electromagnet is provided on the gripper to attract the blade in space, so that the blade can be processed continuously through six stations in sequence, which improves the production efficiency and the automation degree. And the connection between the guide rail and the gripper adopts a flexible connection method, which can reduce the manufacturing difficulty and cost of the guide rail, and ensure the reliability of the operation of the device.

DETAILED DESCRIPTION OF THE EMBODIMENTS

Hereinafter, the present disclosure will be further described with reference to accompanying drawings of the specification, and the present disclosure is not limited to the following embodiments.

Figure 1:
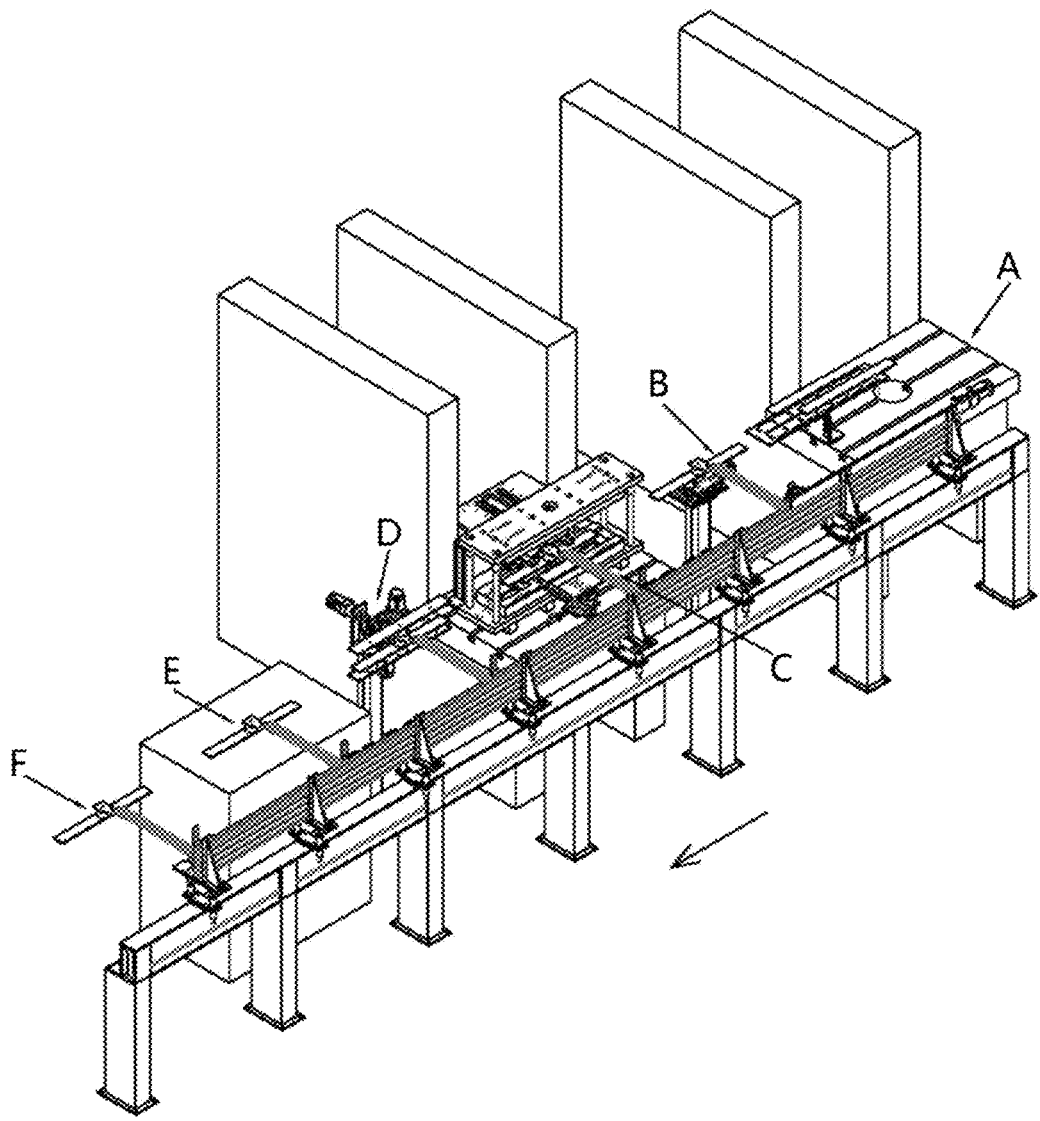
FIG. 1 is a schematic diagram according to an embodiment of the present disclosure.
Figure 2:
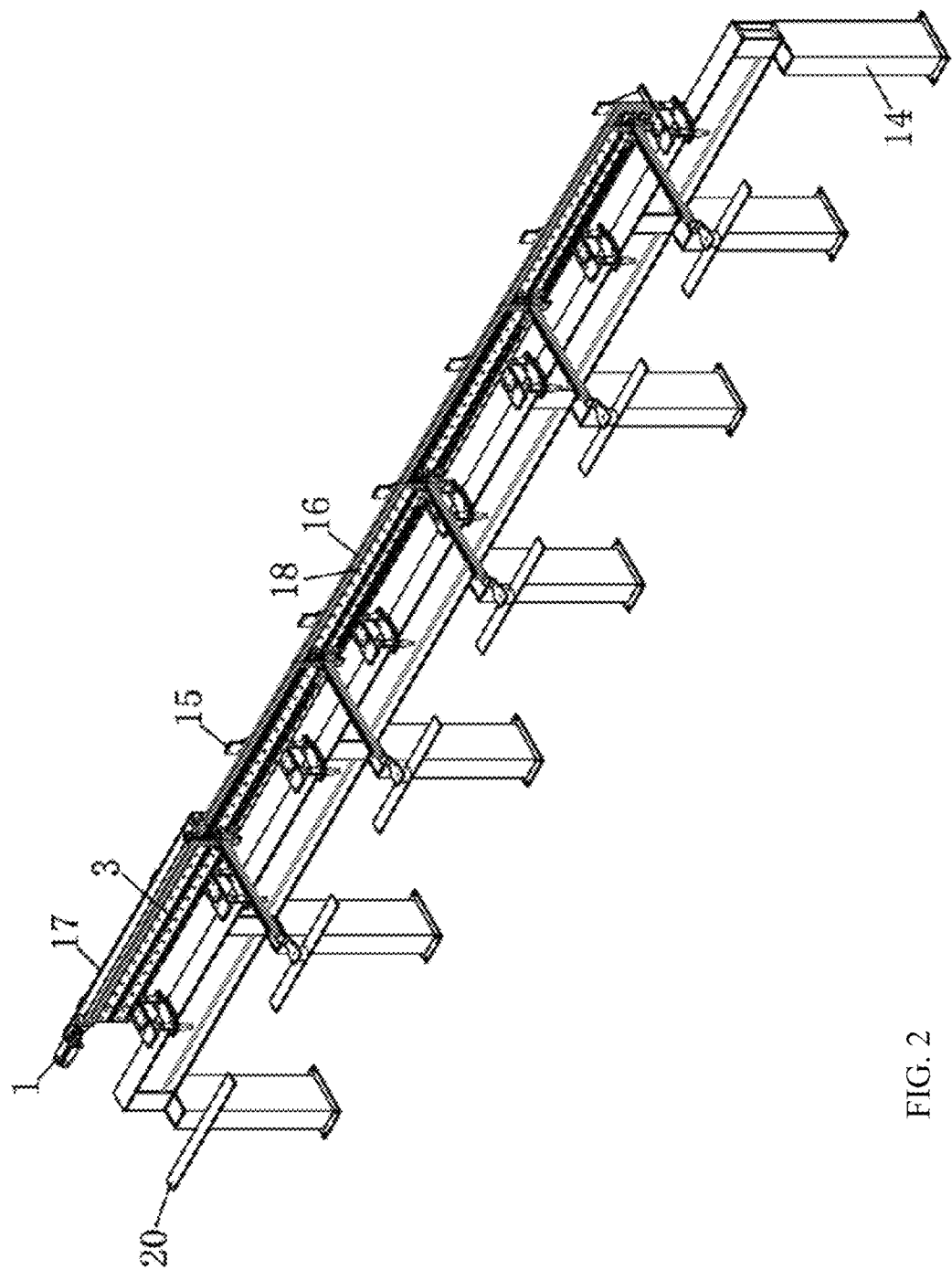
FIG. 2 is a first schematic diagram showing a perspective structure according to an embodiment of the present disclosure.
Figure 3:
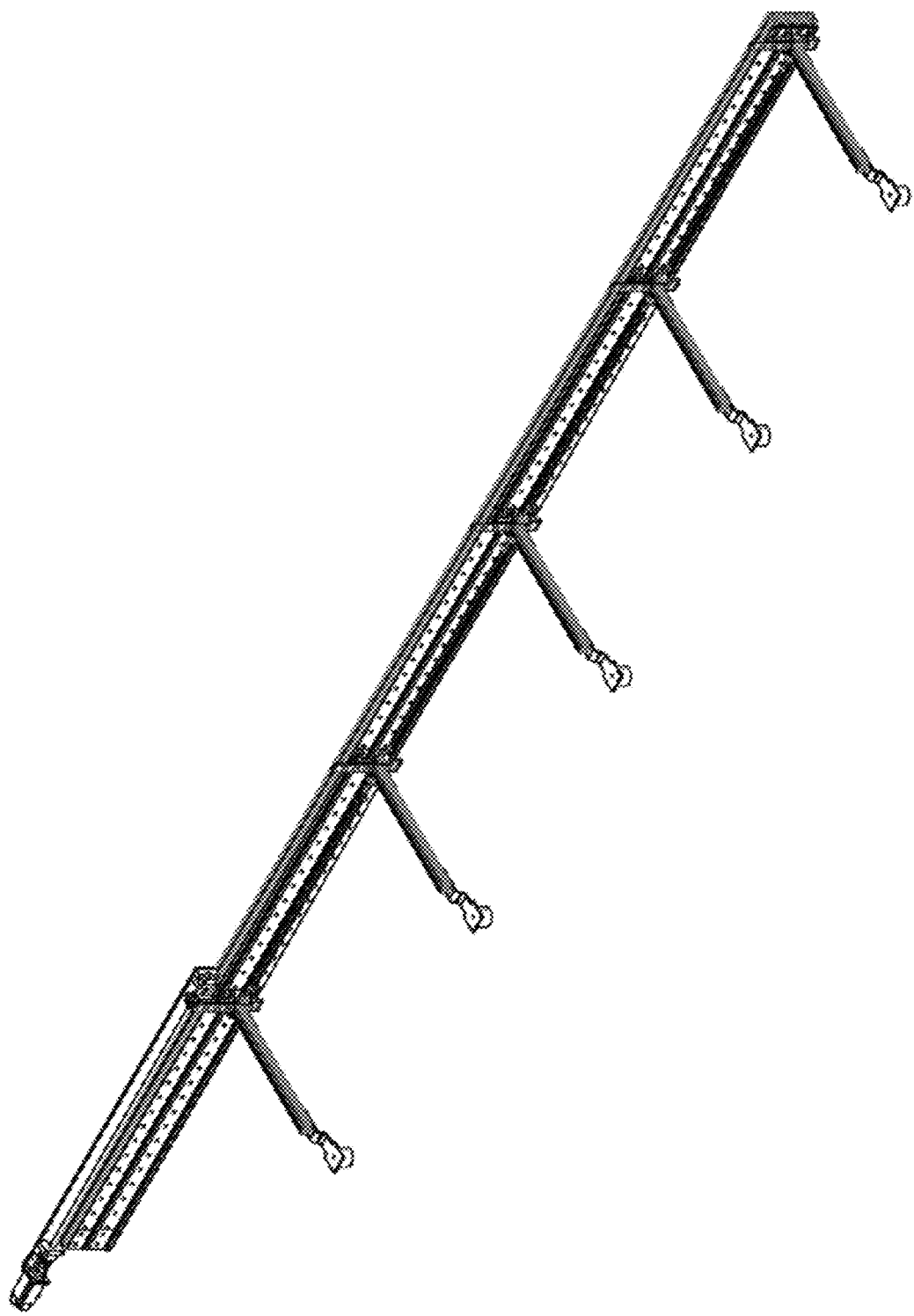
FIG. 3 is a second schematic diagram showing the perspective structure according to an embodiment of the present disclosure (a platform is removed).
Figure 4:
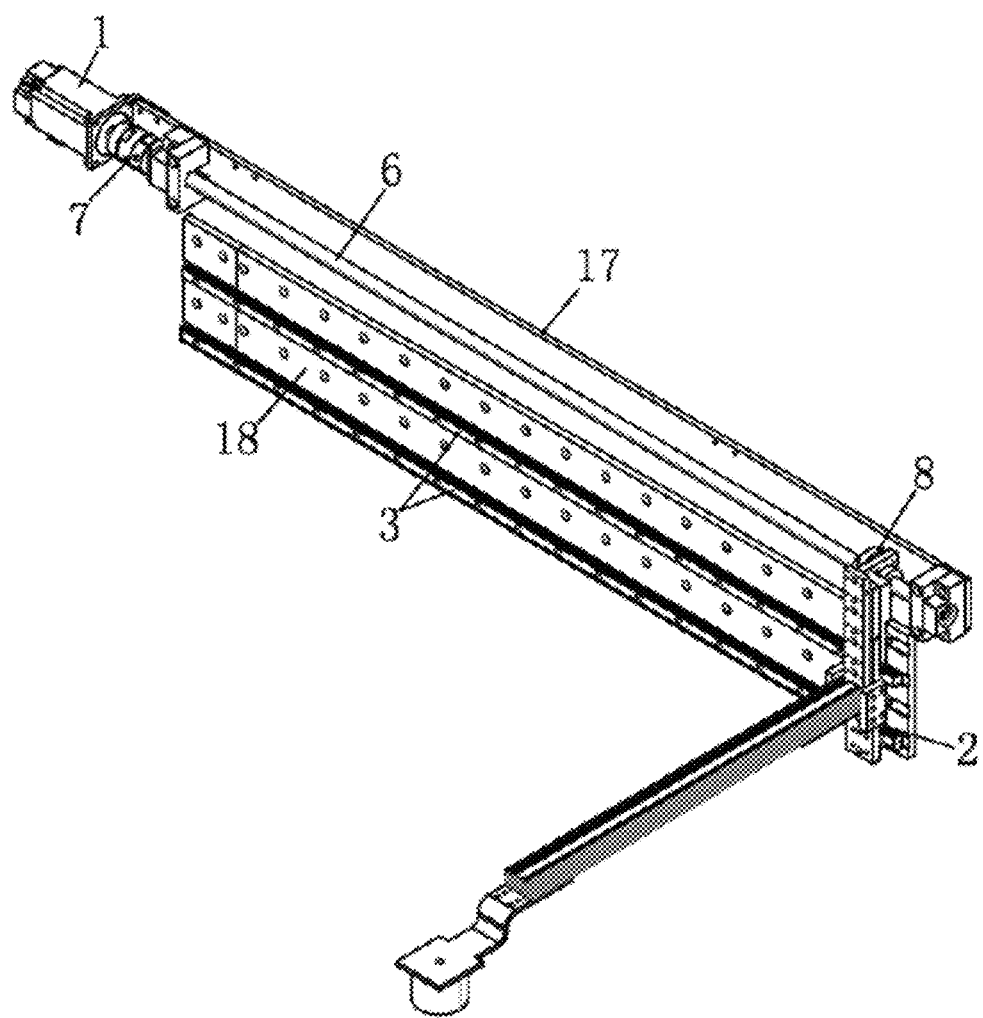
FIG. 4 is a schematic diagram showing a perspective structure of a lead screw mechanism according to an embodiment of the present disclosure.

As shown in FIG. 1, a conveying device for a lawn mower blade includes a platform, a motor 1, grippers, a guiding mechanism, a lead screw mechanism, and a synchronization mechanism. The device is equipped with five grippers. The five grippers may all be provided on the platform horizontally and slidably through the guiding mechanism. The lead screw mechanism is configured to transmit a motive power of the motor to translate one of the five grippers. The synchronization mechanism is provided between adjacent two grippers, so that all the grippers are translated synchronically.

The platform includes a base 14 on which a plurality of brackets 15 are fixed. A horizontally arranged guide rail support plate 16 is fixed to the plurality of brackets. A horizontally arranged lead screw support plate 17 is also fixed to the plurality of brackets, and the lead screw support plate is arranged above the guide rail support plate. The motor is fixed with the lead screw support plate. The lead screw mechanism is installed on the lead screw support plate.

The lead screw mechanism includes a lead screw 6, a coupling 7 and a nut 8. The lead screw is provided on the lead screw support plate and rotated around a horizontal axis, and arranged horizontally with the guide rail. An output shaft of the motor and the lead screw are coaxially connected through the coupling. And the nut is engaged with the lead screw.

The guiding mechanism includes a horizontally arranged guide rail, and five sliding blocks 2 slidably matched with the guide rail. The guide rail includes five sections 3 arranged in sequence along a horizontal direction. Each section is fixed to the guide rail support plate via a segment support plate 18. And each segment is provided with a single one sliding block, and the single one sliding block only moves on this segment.

Figure 5:
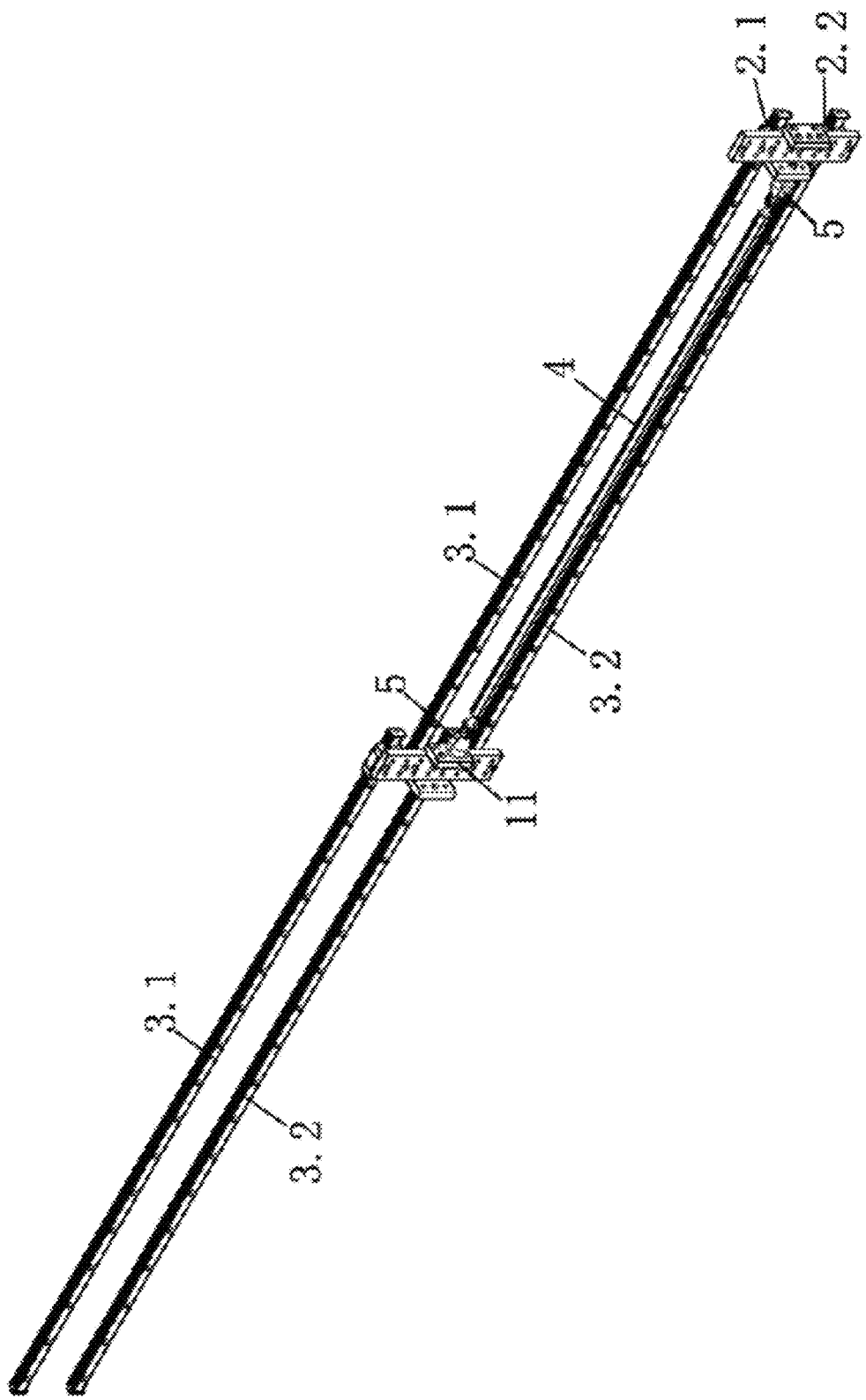
FIG. 5 is a schematic diagram showing a perspective structure of a guiding mechanism according to an embodiment of the present disclosure.
Figure 6:
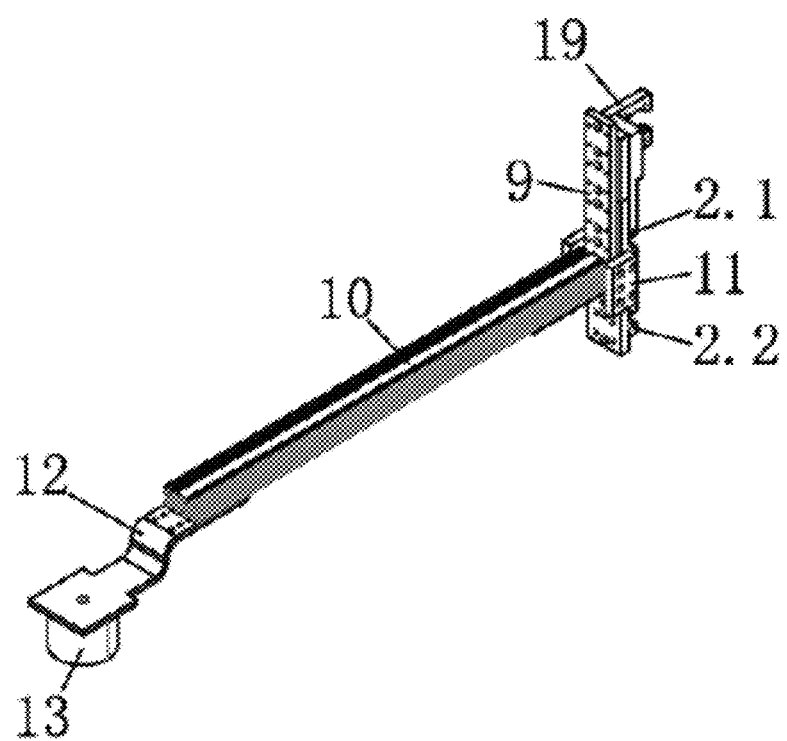
FIG. 6 is a schematic diagram showing a perspective structure of a gripper according to an embodiment of the present disclosure.

As shown in FIG. 5, each segment includes an upper segment 3.1 and a lower segment 3.2 arranged from up to down. And the sliding block includes an upper sliding block 2.1 slidably matched with the upper segment and a lower sliding block 2.2 slidably matched with the lower segment.

Each of the grippers includes a mounting seat 9, a cantilever 10, first connecting plates 11, a second connecting plate 12 and an electromagnet 13. The mounting seat is fixed to both the upper sliding block and the lower sliding block. The cantilever is arranged horizontally and fixed to the mounting seat. The first connecting plates are respectively fixed on two sides of the mounting seat. And the electromagnet is fixed to a front end of the cantilever through the second connecting plate. The nut of the lead screw mechanism is fixed to the mounting seat of the gripper provided beneath this lead screw mechanism through the third connecting plate 19.

The synchronization mechanism is arranged between two adjacent grippers, so that every two adjacent grippers are connected to realize the synchronous movement. The synchronization mechanism includes a connecting rod 4 and universal joints 5. The universal joints are arranged at two ends of the connecting rod. And the two ends of the connecting rod are fixed to the first connecting plates of the grippers, which are on two sides of this connecting rod, through the respective universal joints.

A length of the guide rail is 5 meters, and the adjacent sections are arranged in a staggered manner. The length of each section is at least 1 meter. Since a longer guide rail is divided into shorter sections, the manufacturing difficulty and cost of the guide rail is greatly reduced. Furthermore, the synchronous mechanism is used to realize a flexible connection between the grippers. In this way, the grippers can also be moved stably along the guide rail although assembly errors exist among the segments, which improves a reliability of an operation of the device.

A working principle of the present disclosure is as follows.

As shown in FIG. 1, a cutting station A, a centering station B, a punching station C, a overturning station D, a stamping station E, and a blanking station F are sequentially arranged along a moving direction (a direction of an arrow in this figure) of a blade 20. And these six stations are arranged side by side with the conveying device.

A blade is first moved to the cutting station A for processing, through an external conveying device. A first gripper is configured to convey the blade at the cutting station A to the centering station B for processing. A second gripper is configured to convey the blade at the centering station B to the punching station C for processing. A third gripper is configured to convey the blade at the punching station C to the overturning station D for processing. A fourth gripper is configured to convey the blade at the overturning station D to the stamping station E for processing. A fifth gripper is configured to convey the blade at the stamping station E to the blanking station F for processing. At the same time, the electromagnet of each gripper is kept at a position above the blade by a height of 1 cm from the blade, and thus the blade is attracted in space by an electromagnetic force. When the motor is started, all the five grippers are driven, and are each reciprocated between corresponding two stations, so that the blade gradually moves backward from a first station to a last station, thereby completing an entire processing process.

What is claimed is:

1. A conveying device for a lawn mower blade, the conveying device comprising: a platform, a motor fixed on the platform, five grippers that are slidably and horizontally provided on the platform through a guiding mechanism, a lead screw mechanism configured to transmit a drive power of the motor to translate one of the five grippers, and a synchronization mechanism connecting every adjacent two of the five grippers; wherein the guiding mechanism comprises a horizontally arranged guide rail, and five sliding blocks that are translatable along the guide rail; the guide rail comprises five sections, and each of the five sections is provided with a corresponding one of the five sliding blocks; each of the five grippers is fixed to the corresponding one of the five sliding blocks; the synchronization mechanism is arranged between adjacent two of the five grippers, and the synchronization mechanism comprises a connecting rod, and universal joints that are provided on two ends of the connecting rod and each connected with a corresponding one of the five grippers; wherein the lead screw mechanism comprises a lead screw arranged on the platform and being rotatable around a horizontal axis, a coupling coaxially connected with both an output shaft of the motor and the lead screw, and a nut engaged with the lead screw and fixed with a corresponding one of the five grippers; and wherein each of the five gripper comprises a mounting seat fixed to the corresponding one of the five sliding blocks, a cantilever fixed to the mounting seat, and first connecting plates fixed at two sides of the mounting seat and configured to connect the universal joints respectively, and an electromagnet fixed on a front end of the cantilever.

2. The conveying device for the lawn mower blade according to claim 1, wherein the platform comprises a base, a guide rail support plate and a lead screw support plate which are fixed on the base.

3. The conveying device for the lawn mower blade according to claim 2, wherein each of the five segments is fixed to the guide rail support plate through a segment support plate; the motor is fixed to the lead screw support plate; and the lead screw mechanism is installed on the lead screw support plate.

* * * * *